United States Patent
Stiner

(10) Patent No.: US 6,449,862 B1
(45) Date of Patent: Sep. 17, 2002

(54) ROLLING WELD SUPPORT GAUGE BLOCK FOR TRANSMISSION ASSEMBLY

(75) Inventor: Walter Keith Stiner, Elwood, IN (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 2 days.

(21) Appl. No.: 09/663,078

(22) Filed: Sep. 15, 2000

(51) Int. Cl.[7] ................................................. G01B 3/30
(52) U.S. Cl. ...................................... 33/567; 33/501.05
(58) Field of Search .......................... 33/567.1, 501.05, 33/501.06, 501.08, 501.09, 501.45, 567

(56) References Cited

U.S. PATENT DOCUMENTS

| | | | |
|---|---|---|---|
| 1,163,921 A | * 12/1915 | Hess | ........................ 33/501.09 |
| 2,685,138 A | * 8/1954 | Revell | ...................... 33/501.45 |
| 2,903,797 A | * 9/1959 | Porter | ..................... 33/501.45 |
| 3,267,580 A | * 8/1966 | Hohwart et al. | ......... 33/501.45 |
| 3,845,560 A | * 11/1974 | Sommer | ....................... 33/567 |
| 4,520,659 A | 6/1985 | Lucia et al. | |
| 4,592,228 A | 6/1986 | Lucia | |
| 5,022,267 A | 6/1991 | Shattuck et al. | |
| 5,471,871 A | 12/1995 | Rogers | |
| 5,537,865 A | 7/1996 | Shultz | |
| 6,004,040 A | 12/1999 | Rode | |

* cited by examiner

Primary Examiner—Christopher W. Fulton
(74) Attorney, Agent, or Firm—Mark P. Calcaterra

(57) ABSTRACT

A weld support gauge block for setting a fused distance between a plate portion and a hat portion of a planetary gear carrier is provided, which includes a first side plate for insertion into and removal from a window cut out in a cylindrical wall of the carrier, a second side plate parallel spaced from the first side plate, a body juxtaposed by the side plates, the body having an interior cavity and a front face and a rear face, the body having a generally central longitudinal bore with a counter bore on a rear end of the body, a first roller juxtaposed between the side plates, and a second roller positioned above the first roller.

9 Claims, 2 Drawing Sheets

ROLLING WELD SUPPORT GAUGE BLOCK FOR TRANSMISSION ASSEMBLY

FIELD OF THE INVENTION

The present invention relates generally to a weld support gauge block utilized in fixing a fused distance between two welded members. More particularly, the present invention relates to a weld support gauge block for setting a fused distance between a plate portion and a hat portion of a planetary gear carrier of an automotive vehicle transmission during a welding of the carrier plate portion to the carrier hat portion, wherein the carrier hat portion has a cylindrical wall fixed with an annular end face and the cylindrical wall has a plurality of geometrically spaced window cut outs for subsequent placement of planetary pinion gears.

BACKGROUND OF THE INVENTION

In most vehicles a transmission is provided in the drive train between the engine and the driven wheels. As is well known, the transmission includes a case containing an input shaft, an output shaft and a plurality of machine gears. Means are provided for connecting selected machine gears between the input shaft and the output shaft to provide a desired speed reduction gear ratio therebetween. The machine gears contained within the transmission case are of varying size so as to provide a plurality of gear ratios. By appropriate selection of these gear ratios acceleration and deceleration of the vehicle can be accomplished in a smooth and efficient manner.

Many transmission structures are known in the art for performing the above noted gear ratio selection manually, i.e., in response to some physical exertion by the vehicle driver. In a conventional manual transmission, the driver grasps and moves an upper portion of a pivotal shift lever. In response thereto, a lower portion of the shift lever is moved into selective engagement with one of a plurality of shift rails provided within the transmission. Thus, movement of the shift lever causes movement of the selected shift rail. Movement of the selected shift rails causes certain of the machine gears to be connected between the input shaft and the output shaft so as to provide the desired gear ratio therebetween.

Many transmission structures are also known in the art for performing the above noted gear ratio selection automatically, i.e., without any physical exertion by the vehicle driver. In a conventional automatic transmission, the shift rails are typically replaced by a plurality of hydraulically actuated structures. In response to predetermined operating condition, the structures cause one of the machine gears to be connected between the input shaft and the output shaft so as to provide the desired gear ratio therebetween. Automatic transmissions offer the advantage of increased convenience of use and reduced fatigue for the vehicle driver.

To provide for smooth shifting between the gear ratios many automatic transmissions utilize planetary gearing. When utilizing planetary gearing typically the planetary gears (sometimes called planet gears) are mounted on a common yoke commonly referred to as a carrier. Typically the carrier will have an annular end face which is weldably connected to a cylindrical wall, sometimes referred to as the hat portion of the carrier. Weldably joined to the cylindrical wall generally opposite the end face is an annular plate. The cylindrical wall of the carrier has typically three or four geometrically spaced cut outs. A series of planetary gears are rotatably mounted within the spaces of the cut outs. The planetary gears are rotatably mounted on shafts having one end connected with the aforementioned end face of the carrier hat portion. The other end of the planetary gear shaft is mounted to the aforementioned annular plate.

The stack height or axial length of the carrier is critical in the dimension of the transmission. Accordingly, care must be taken during fabrication of the carrier that the distance between the end face of the hat portion and the annular plate of the carrier be held to very high exacting tolerances. During carrier fabrication wherein the carrier hat is weldably connected with its annular plate a series of weld support gauge blocks are automatically inserted by the weld machine to ensure the desired distance between the annular plate and the end face. Prior to the present invention these weld support gauge blocks typically suffered excessive wear upon their removal from the windows in the hat portion cylindrical wall caused by friction of rubbing between the hat portion annular end face and the annular plate. Making the weld support gauge blocks harder did not provide a solution in that the weld support gauge blocks would tend to gouge metal away after removal from the window cut outs. Making weld support gauge blocks of softer metal prevented the gouging problem but exposed the weld support gauge blocks to the aforementioned excessive wear. Excessive wear of the weld support gauge blocks increased repair time for the welding machine operation.

It is desirable to provide a weld support gauge block for insertion and removal into a cylindrical wall window cut out of a hat portion of a transmission carrier which has a high resistance to wear while at the same time a low tendency to gouge or deform the metal of the hat portion or the annular plate portion of the carrier.

SUMMARY OF THE INVENTION

To make manifest the above delineated and other manifold desires the revelation of the present invention is brought forth. The present invention provides a weld support gauge block for setting a fused distance between a plate portion and a hat portion of a planetary gear carrier of an automotive vehicle transmission during a welding of the carrier plate portion wherein the carrier hat portion has a cylindrical wall connected to an annular end face and the cylindrical wall has a plurality of geometrically spaced window cut outs for subsequent placement of planet pinion gears retainable about shafts with opposed ends fixed with the annular end face of the carrier hat portion and the carrier plate portion. The weld support gauge block includes a first side plate having front and rear upper and lower tapered edges. The first side plate is provided for insertion into and removal from the window cut outs in the cylindrical wall of the carrier hat portion. A second side plate parallel spaced from the first side plate is also provided. The second side plate has front and rear tapered upper and lower edges for insertion into and removal from the window cut out in the cylindrical wall of the carrier hat portion. The support gauge block also has a body juxtaposed by the first and second side plates. The body has an interior cavity, a front face and a rear face. The body also has a generally central longitudinal bore with a counter bore along its end. A first roller with dual wheels positioned on a common axle is also provided. The first roller wheels are bifurcated by the body central bore and the axle of the first roller is generally positioned perpendicular with respect to the central bore. The first roller is juxtaposed between the first and second side plates and the common axle of the first roller has its extreme end mounted within blind bores of the first and second side plates. The first roller has contact with the carrier plate portion during the welding which is conducted to fuse the plate portion with the carrier hat portion. A second roller is provided positioned above the first roller. The second roller has dual wheels provided on a common axle which is positioned perpendicular with respect to the central bore. The second roller wheels are also bifurcated by the central bore. The second roller is also juxtaposed between the first and second side plates and the extreme end of the second roller axle is fitted within blind bores of the first and second side plates. The second roller wheels contact the carrier hat portion annular end face when the carrier plate is being fused with the hat portion of the carrier. Due to the rollers of the weld support gauge block of the present invention, gouging of the carrier by the weld support gauge block is inhibited. Additionally, the weld support gauge block by its roller design diminishes friction between the weld support gauge block and the carrier during the insertion and removal. Accordingly, the necessity of weld support gauge block replacement is significantly reduced.

It is a feature of the present invention to provide a weld support gauge block for setting a fused distance between a plate portion and a hat portion of a planetary gear carrier of an automotive vehicle transmission during welding of the carrier plate portion to the carrier hat portion. Other features of the invention will become more apparent to those skilled in the art upon a reading of the following detailed description and upon reference to the drawings.

DETAILED DESCRIPTION OF THE INVENTION

Figure 1:
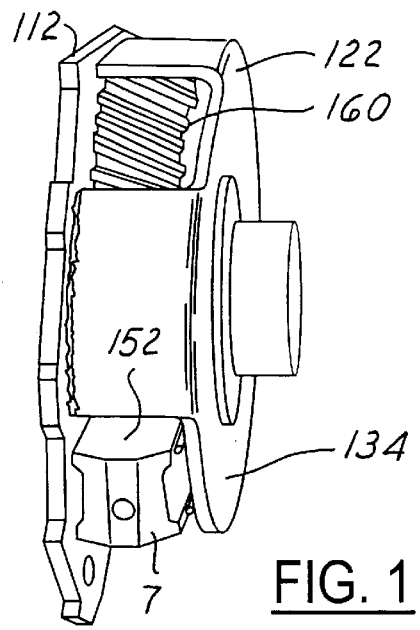
FIG. 1 is a side perspective view of a weld support gauge block according to a preferred embodiment of the present invention illustrating its position of insertion between a plate portion and a hat portion of an automotive vehicle transmission carrier, which additionally shows the position of the pinion gear.
Figure 1A:
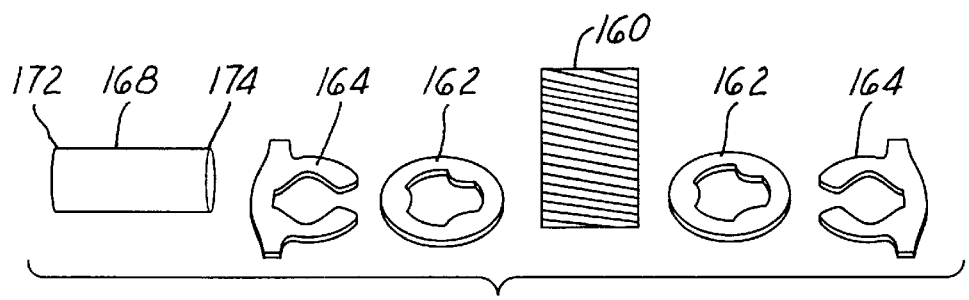
FIG. 1A is an exploded view of the pinion gear assembly fitted within the carrier shown in FIG. 1.

A weld support gauge block 7 according to the present invention has a first side plate 30. The side plate 30 has a front end 34, The side plate 30 has a rear end 36. The first side plate 30 lower front end edge 38 has a 60 degree taper. The first side plate upper front end edge 40 has a 60 degree taper. The first side plate rear upper end edge 42 has a 30 degree taper. The first side plate rear lower end edge 44 has a 30 degree taper. The purpose of the 30 degree taper is to prevent damage during insertion of the weld support gauge block. The first side plate has an upper blind bore 46. The first side plate has a lower blind bore 48. The first side plate 30 is provided for insertion into and removal from the cut outs and the cylindrical wall of the carrier hat portion. The first side plate 30 has two tapped holes 61 which intersect a counter-bore 63.

Parallel spaced from the first side plate 30 is a second side plate 54. Typically the second side plate 54 will be a mirror image of the first side plate 30 and further details of the second side plate 54 are therefore not repeated.

The first and second side plates 30, 54 juxtapose between them a body 70. The body 70 has a front end 72 and a rear end 74. The body 70 has a central cavity 78. The body 70 also has a generally central longitudinal bore 82 which is intersected on its back face by a counter bore 86. Along its front and rear upper and lower edges the body 70 has tapers which correspond with the tapers of the first and second side plates 30 and 54. The body 70 has a middle portion 88 which juxtaposes its two side portions 92. The side portions 92 mate with the first and second side plates 30, 54. The body 70 has four tapped holes 96 to allow for threaded connection to the first and second side plates 30, 54 via fasteners 95.

The weld support gauge block 7 further includes a first roller 100. The first roller 100 has dual wheels 104. The wheels 104 are positioned on a common axle 108. The first roller wheels 104 are bifurcated by the body central bore 82. The first roller axle 108 is positioned generally perpendicular with respect to the central bore 82. The first roller wheels 104 are juxtaposed between the first and second side plates 30, 54. The first roller wheels 104 are contacting with the carrier plate portion 112 when the carrier plate portion 112 is being fused with cylindrical wall 118 of the carrier hat portion 122 (FIG. 1). The extreme ends 124 of the axle 108 of the first roller 100 are fitted within the blind bores 48 of the first and second side plates 30, 54.

A second roller 130 is also provided. The second roller 130 is positioned above the first roller. The mounting, shape and size of the second roller 130 will typically be identical to that of the first roller 100. The second roller is contacting with the carrier hat portion end face 134 when the plate portion 112 of the carrier is fused with the hat portion of the carrier.

Figure 2:
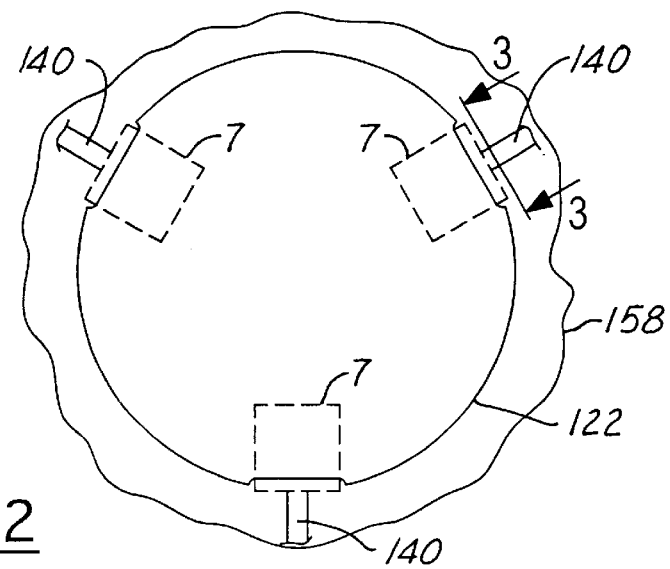
FIG. 2 is an operational view illustrating the insertion of the weld support gauge block during the welding process of the automotive carrier.
Figure 3:
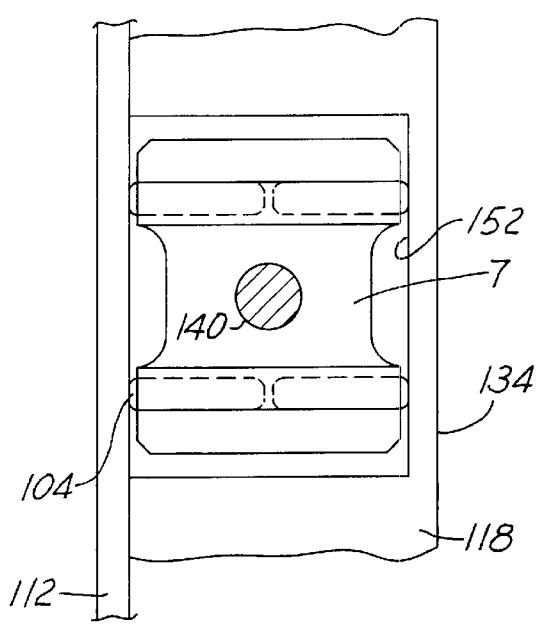
FIG. 3 is a side elevational view of the weld support gauge block of the present invention being inserted into a window cut out of the carrier during the welding of the carrier plate portion to the carrier hat portion.
Figure 4:
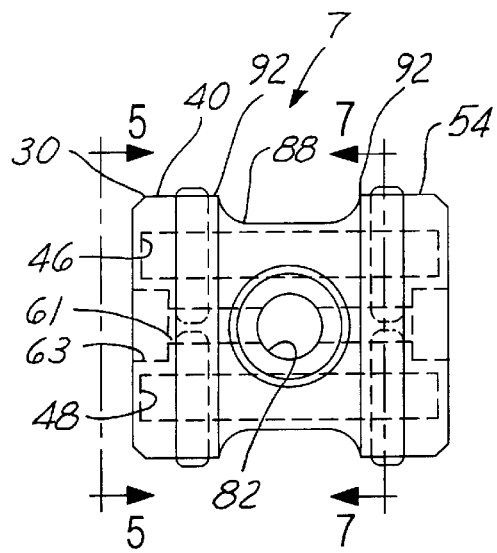
FIG. 4 is a side elevational view of the weld support gauge block.
Figure 6:
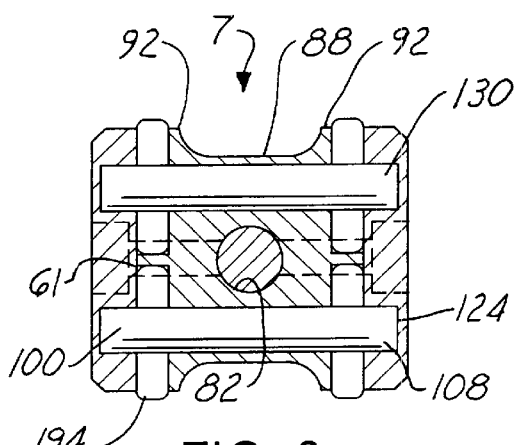
FIG. 6 is a view taken along lines 6—6 of FIG. 5.
Figure 5:
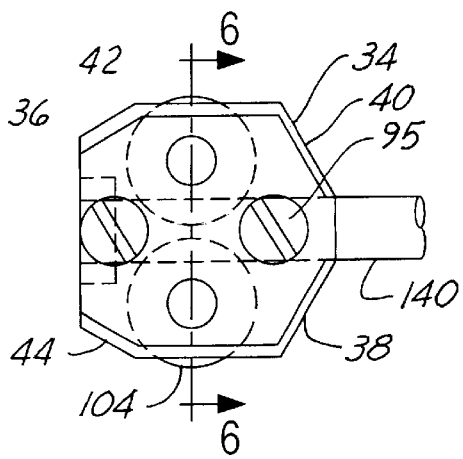
FIG. 5 is a view taken along lines 5—5 of FIG. 4.
Figure 7:
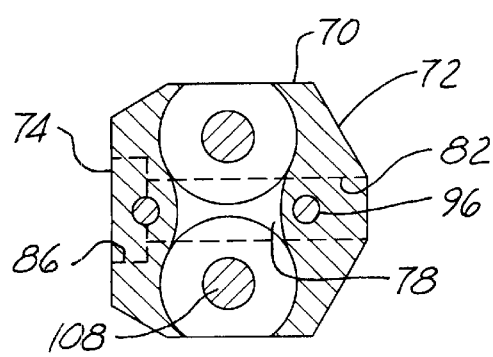
FIG. 7 is a view taken along lines 7—7 of FIG. 4.

In operation, an injection rod 140 is fixably connected with the weld support gauge block 7 via insertion with a threaded fastener (not shown) which has a head seated in the counter-bore 86, and passes through the central bore 82 of the body. The weld support gauge block is placed within a window cut out 152 of the cylindrical wall 118 of the carrier hat portion and is positioned within the cut out 152 during the welding operation of the carrier plate portion 112 to the carrier cylindrical portion. The 30 degree taper of the side plates 30, 54 upper and lower edges 42, 44 prevent damage during insertion into the window cut out 152. The 60 degree taper of the front end upper and lower edges 38, 40 are mated with a weld machine receiver (not shown) which provides perpendicular and horizontal alignment to the weld support gauge block 7. Upon fusing the two parts together, the weld support gauge block 7 is removed by appropriate hydraulics. The first and second rollers 100, 130 will set the distance between the plate portion 112 and the annular end face 134 of the hat portion of the carrier during the welding operation and will roll out after such operation preventing any damage or marring of the carrier plate portion 112 or the carrier hat portion annual end face 134. As will be apparent to those skilled in the art, typically the welding machine 158 will have at least three geometrically spaced weld support gauge blocks, as best shown in FIG. 2. After the welding is complete, a pinion planetary gear 160 with its associated washers 162, 164 will be placed within annular cut outs 152 to be mounted by a shaft 168 which has an extreme end 172 for mounting in the annular plate 112 and extreme end 174 for mounting in the annular end face 134 of the hat section 132.

While the invention has been described in connection with a preferred embodiment, it will be understood that it is not intended to limit the invention to that particular embodiment. On the contrary it is endeavored to cover all alternatives, modifications and equivalent as may be included within the spirit and scope of the invention as encompassed by the description and as defined by the appended claims.

I claim:

1. A weld support gauge block for setting a fused distance between a plate portion and a hat portion of a planetary gear carrier of an automotive vehicle transmission during a welding of said plate portion to said hat portion of said carrier, said carrier hat portion having a cylindrical wall portion connected to an annular end face, said carrier hat portion cylindrical wall having a plurality of geometrically spaced window cut outs for subsequent placement of planetary gears rotatable about shafts with opposed ends fixed with said carrier plate portion and said carrier hat portion end face, said weld support gauge block comprising:

a first side plate for insertion into and removal from said window cut outs in said cylindrical wall of said carrier hat portion;

a second side plate parallel spaced to said first side plate for insertion into and removal from said window cut outs in said cylindrical wall of said carrier hat portion;

a first roller having dual wheels connected via a common axle and juxtaposed between said first and second side plates and rotatably attached thereto, said first roller being in contact with said carrier plate portion when said carrier plate portion is fused with said carrier hat portion of said carrier; and a second roller juxtaposed between said first and second side plates and rotatably attached thereto, said second roller being in contact with said carrier hat portion end face of said carrier when said carrier plate portion is fused with said hat carrier of said carrier.

2. A weld support gauge block as described in claim 1, wherein said second roller has dual wheels joined together via a common axle shaft.

3. A weld support gauge block as described in claim 1, wherein said side plates have tapered edges.

4. A weld support gauge block as described in claim 3, wherein said front tapered edges of said side plates are tapered at 60 degrees.

5. A weld support gauge block as described in claim 3, wherein said side plates have rear tapered edges at 30 degrees.

6. A weld support gauge block for setting a fused distance between a plate portion and a hat portion of a planetary gear carrier of an automotive vehicle transmission during a welding of said carrier plate portion to said carrier hat portion, said carrier hat portion having a cylindrical wall connected to an angular end face, said cylindrical wall having a plurality of geometrically spaced window cut outs for subsequent placement of planetary pinion gears rotatable about shafts with opposed ends fixed with said annular end face of said carrier hat portion and said carrier plate portion, said weld support gauge block comprising:

a first side plate having front and rear upper and lower tapered edges for insertion into and removal from said window cut out in said cylindrical wall of said carrier hat portion;

a second side plate parallel spaced from said first side plate, said second side plate having front and rear upper and lower tapered edges for insertion into and removal from said window cut out in said cylindrical wall of said carrier hat portion;

a body juxtaposed by said first and second side plates, said body having an interior cavity and a front face and a rear face, said body having a generally central longitudinal bore with a counter bore on a rear end of said body;

a first roller with dual wheels positioned on a common axle, said first roller wheels being bifurcated by said body central bore and said axle being generally perpendicular positioned with respect to said central bore, said first roller being juxtaposed between said first and second side plates, said first roller contacting said carrier plate portion when said carrier plate portion is fused with said carrier hat portion; and a second roller positioned above said first roller, said second roller having dual wheels on a common axle generally perpendicular positioned with respect to said central bore, and said second roller wheels being bifurcated by said central bore, said second roller being juxtaposed between said first and second side plates, said second roller wheels contacting said carrier hat portion end face when said plate portion is fused with said hat portion of said carrier.

7. A weld support gauge block as described in claim 6, wherein said first roller axle has extreme ends fitted within blind bores of said side plates.

8. A weld support gauge block as described in claim 6, wherein said second roller axle has extreme ends fitted within blind bores of said side plates.

9. A weld support gauge block as described in claim 8, wherein said first roller axle has extreme ends fitted within blind bores of said side plates.

* * * * *